Patented Sept. 7, 1948

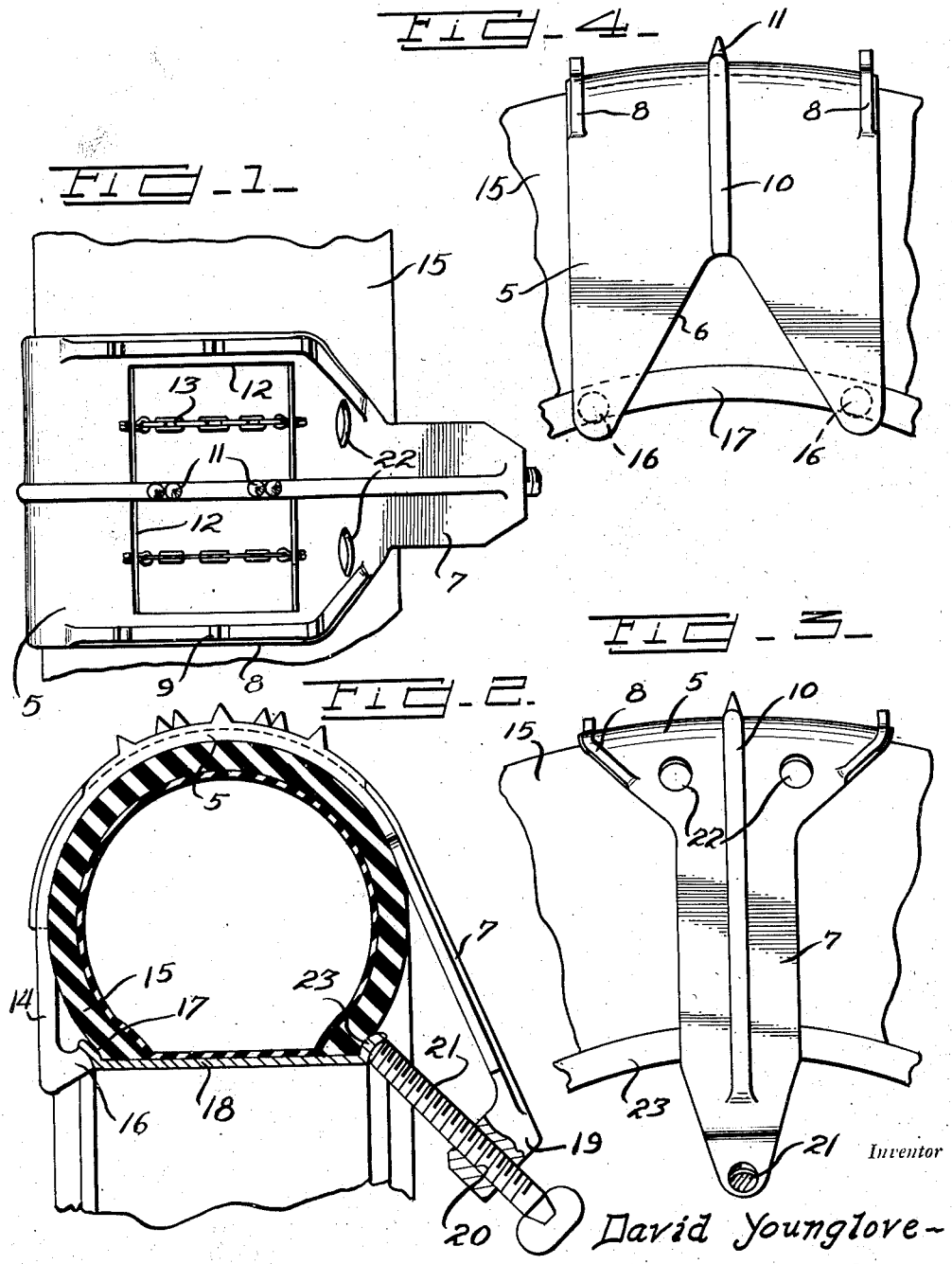

2,449,033

UNITED STATES PATENT OFFICE 2,449,033

ANTISKID TIRE CLAMP

David Younglove, Ilion, N. Y.

Application September 12, 1946, Serial No. 696,496

1 Claim. (Cl. 152—226)

This invention relates to new and useful improvements in anti-skid tire clamps for vehicle wheels and more particularly to an individual tire cleat which is easily attached to any vehicle having rubber tires, so that the vehicle will not skid or become stuck in soft ground.

Another feature of this invention is to provide a device of this character which can be readily attached to any vehicle tire without the use of special tools and without soiling the hands or clothing by kneeling or crawling under the vehicle.

A further feature of this invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the invention attached to a tire and rim (shown in part), Figure 2 is a side elevational view of the invention attached to a tire and rim (shown in cross section), Figure 3 is a front elevational view of the invention attached to a tire and rim, Figure 4 is a rear view thereof.

Referring now to the drawing, wherein for the purpose of illustration, I have disclosed a preferred embodiment of the invention, the numeral 5 designates a curved metal strap or hook having an inverted V-shaped notch 6 at its inner end and an outwardly inclined tongue 7 at its outer end. Extending upwardly from the curved edges of strap 5 are a pair of transverse ribs 8, having upwardly projecting teeth 9. A third transverse rib 10 extends upwardly from the center of the strap and runs from the tongue to the V-shaped notch. Projecting upwardly from this rib are cleats 11. On the upper surface of the strap and between ribs 8 and 10 are a pair of rectangular openings 12. A pair of chains 13 bisect these openings and are fastened to the side edges of these openings in any suitable manner. The lower inner ends 14 of strap 5 are bent inwardly toward a tire 15 to form a pair of gripping lugs 16 which grip into an outturned flange 17 of a conventional rim 18 of a vehicle. The lower end 19 of tongue 7 is bent inwardly and has a treaded hole 20 for receiving a thumb screw 21 therein as shown in Figure 2.

To attach the device to a conventional wheel the strap is placed transversely on the top of the tire 15 and the lugs 16 are slipped down until they grip the flange 17 of the rim 18 the strap can then be pulled tightly by the finger holes 22. The inner end of thumb screw 21 is then placed against outer flange 23 of the rim and thumbscrew 21 is tightened by turning thereby holding the device tightly in place.

In view of the foregoing description taken in connection with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A traction device for use on a tire and attachment to the out-turned side flanges of a tire-retaining rim comprising a hook-shaped member adapted to straddle the tire and provided on one end with gripping lugs adapted to seat against one of said flanges, said member having at its other end a reduced tongue adapted to extend alongside the other of said flanges, an end thumb screw in said tongue adapted to be turned against said other flange, said screw coacting with said lugs to clamp the member to the outer sides of said flanges.

DAVID YOUNGLOVE.

REFERENCES CITED

The following references are of record in the file of this patent:

UNITED STATES PATENTS

| Number | Name | Date |
|---|---|---|
| 1,250,866 | Harrison | Dec. 18, 1917 |
| 1,574,791 | Clark | Mar. 2, 1926 |
| 1,775,211 | Pearson | Sept. 9, 1930 |